United States Patent
Yuen et al.

(10) Patent No.: US 9,441,963 B2
(45) Date of Patent: Sep. 13, 2016

(54) MULTIFUNCTION LASER LEVELING TOOL

(75) Inventors: Eric Hung-Ying Yuen, Hong Kong (CN); Wah Pong Chan, Hong Kong (CN); Yat Wah Lam, Hong Kong (CN)

(73) Assignee: Robert Bosch Company Limited, Hong Kong (CN)

(*) Notice: Subject to any disclaimer, the term of this patent is extended or adjusted under 35 U.S.C. 154(b) by 88 days.

(21) Appl. No.: 14/378,180

(22) PCT Filed: Feb. 17, 2012

(86) PCT No.: PCT/CN2012/071261
§ 371 (c)(1),
(2), (4) Date: Aug. 12, 2014

(87) PCT Pub. No.: WO2013/120271
PCT Pub. Date: Aug. 22, 2013

(65) Prior Publication Data
US 2015/0000144 A1    Jan. 1, 2015

(51) Int. Cl.
G01C 9/06 (2006.01)
G01C 15/00 (2006.01)
G01B 7/30 (2006.01)
G01C 9/12 (2006.01)

(52) U.S. Cl.
CPC . *G01C 9/06* (2013.01); *G01B 7/30* (2013.01); *G01C 9/12* (2013.01); *G01C 15/004* (2013.01); *G01C 2009/066* (2013.01)

(58) Field of Classification Search
CPC ........ G01C 9/06; G01C 9/12; G01C 15/004; G01C 9/14; G01C 15/008; G01B 7/30; G01B 5/24
USPC ........................................... 33/286, 290, 291
See application file for complete search history.

(56) References Cited

U.S. PATENT DOCUMENTS

| | | | | |
|---|---|---|---|---|
| 5,636,018 A * | 6/1997 | Hirano | ............... | G01B 11/26 33/291 |
| 6,384,420 B1 * | 5/2002 | Doriguzzi Bozzo | .... | G01C 9/16 250/548 |
| 6,763,595 B1 | 7/2004 | Hersey | | |
| 6,922,901 B1 * | 8/2005 | Chou | ............... | G01C 15/004 33/279 |
| 7,121,010 B2 * | 10/2006 | Marshall | ............... | G01C 15/004 33/227 |
| 7,134,211 B2 * | 11/2006 | Bascom | ............... | G01C 15/002 33/286 |
| 7,237,341 B2 * | 7/2007 | Murray | ............... | G01C 15/00 33/286 |
| 7,370,427 B2 * | 5/2008 | Ammann | ............... | G01C 15/004 33/290 |
| 7,454,839 B2 * | 11/2008 | Della Bona | ............... | F16M 11/14 33/281 |
| 7,500,317 B2 * | 3/2009 | Steffen | ............... | G01C 15/002 33/286 |
| 7,571,546 B1 * | 8/2009 | Sergyeyenko | ............... | G01C 15/02 33/286 |
| 7,730,624 B2 * | 6/2010 | Nishimura | ............... | G01C 15/004 33/286 |
| 2013/0167386 A1 * | 7/2013 | Peng | ............... | G01C 15/004 33/290 |
| 2014/0190025 A1 * | 7/2014 | Giger | ............... | G01C 15/002 33/228 |

FOREIGN PATENT DOCUMENTS

| | | |
|---|---|---|
| CN | 1458499 A | 11/2003 |
| CN | 201255639 Y | 6/2009 |
| CN | 201297572 Y | 8/2009 |

OTHER PUBLICATIONS

International Search Report corresponding to PCT Application No. PCT/CN2012/071261, mailed Nov. 29, 2012 (English language document) (7 pages).

* cited by examiner

*Primary Examiner* — Christopher Fulton
(74) *Attorney, Agent, or Firm* — Maginot, Moore & Beck LLP

(57) ABSTRACT

A multifunction laser leveling tool (1) is provided. The multifunction laser leveling tool (1) comprises: a housing (2); a pendulum (28) supported by the housing (2) via a universal joint so that the pendulum (28) is pivotable with respect to the housing (2) around a first axis (24) and a second axis (26) perpendicular to the first axis (24); a locking means (4) which is able to fixedly lock the pendulum (28) to the housing (2) and to release the pendulum (28) therefrom, wherein when the pendulum (28) is released, the pendulum (28) is in a plumb orientation and the first and second axes (24,26) lie in a horizontal plane; a first laser beam emitter (36) attached to the pendulum (28) for emitting a first laser plane; an angle sensing means (44) attached to the pendulum (28) for measuring the orientation of the pendulum (28); a display module having two sections (6,8) attached to the housing (2) for displaying the measured orientation of the pendulum (28).

17 Claims, 3 Drawing Sheets

MULTIFUNCTION LASER LEVELING TOOL

This application is a 35 U.S.C. § 371 National Stage Application of and claims the benefit of priority to PCT/CN2012/071261, filed on Feb. 17, 2012 in China, the disclosure of which is incorporated herein by reference in its entirety.

TECHNICAL FIELD

The disclosure relates to a multifunction laser leveling tool comprising improved functionalities for determining and displaying the angle of a laser line and generating a laser line with a predetermined angle.

BACKGROUND

Laser leveling tools or levelers are generally used in construction industry. A conventional laser leveling tool comprises a frame, a pendulum universally suspended on the frame and defining a vertical plumb line, and at least one laser beam emitter mounted on the pendulum for emitting a laser plane which is projected onto an object to form a straight laser line, serving as a plumb or horizontal line for facilitating operation during construction or remodeling.

Current laser leveling tools generally only have a plumb and/or horizontal line generating function, which cannot meet all requirements in construction or remodeling operations.

For example, there are occasions that oblique lines with certain slopes should be generated. The slopes may include, such as the slope of a handicap ramp, the slope of a drainage pipe, or the slopes of other architectural features. In these cases, a laser leveling tool does not help; rather, a digital leveler or other means is generally used for generating such oblique lines. However, the position requirement of these sloped lines may be challenging when these lines are required on irregular surfaces or on exterior inaccessible heights such as a roof line of a house. In most cases, more than one person is needed to generate such lines.

Further, in some cases, the slope of an existing construction needs to be measured, such as the slope of a drainage pipe or the grading of a ramp. In these cases, a digital leveler, not a laser leveling tool, is needed but the measurement is made locally because it is limited by the length of the leveler.

It is thus highly desired to have a multifunction tool which has at least the functions described above: leveling, oblique line generating, and oblique angle measuring.

SUMMARY

In view of the problems existed in the prior art, an object of the disclosure is to provide a multifunction laser leveling tool which is able to generate a plumb or horizontal laser line onto an object, to generate an oblique laser line with a certain angle, to measure and display the angle of an oblique line or an oblique surface, etc.

For achieving this object, in one aspect, the present disclosure provides a multifunction laser leveling tool which comprises: a housing; a pendulum supported by the housing via a universal joint so that the pendulum is pivotable with respect to the housing around a first axis and a second axis perpendicular to the first axis; locking means which is able to fixedly lock the pendulum to the housing and to release the pendulum therefrom, wherein when the pendulum is released, the pendulum is in a plumb orientation and the first and second axes lie in a horizontal plane; a first laser beam emitter attached to the pendulum for emitting a first laser plane which is parallel to or coplanar with the plane in which the first and second axes lie; angle sensing means attached to the pendulum for measuring the orientation of the pendulum; and a display module attached to the housing for displaying the measured orientation of the pendulum.

In accordance with a preferred embodiment of the disclosure, the multifunction laser leveling tool further comprises a second laser beam emitter for emitting a second laser plane which forms an angle with (for example, perpendicular to) the first laser plane and in which the first axis lies or to which the first axis is parallel.

In accordance with a preferred embodiment of the disclosure, the multifunction laser leveling tool further comprises a third laser beam emitter for emitting a third laser plane which forms an angle with (for example, perpendicular to) the first laser plane and in which the second axis lies or to which the second axis is parallel.

In accordance with a preferred embodiment of the disclosure, the angle sensing means comprises: two single axis accelerometers or a two axis or three axis accelerometer; or two single axis bubble vials or a single circular bubble vial; or a capacitive angle sensor.

In accordance with a preferred embodiment of the disclosure, the display module comprises a screen on which the measured orientation of the pendulum is displayed and a display module driver which drives the screen.

In accordance with a preferred embodiment of the disclosure, the multifunction laser leveling tool further comprises a microcontroller unit for processing and/or digitizing signals from the angle sensing means and output digitized data to the display module driver.

In accordance with a preferred embodiment of the disclosure, the microcontroller unit is attached to the pendulum, and the microcontroller unit is in communication with the display module driver via a signal transmitter attached to the pendulum and a signal receiver attached to the housing, or via a connection wire or cable.

Alternatively, the microcontroller unit is attached to the housing, and the angle sensing means is in communication with the microcontroller unit via a signal transmitter attached to the pendulum and a signal receiver attached to the housing, or via a connection wire or cable.

In accordance with a preferred embodiment of the disclosure, a signal transmitted from the signal transmitter to the signal receiver is in infrared or radio frequency.

In accordance with a preferred embodiment of the disclosure, the housing comprises feet for supporting the multifunction laser leveling tool onto a resting surface, at least one of the feet having an adjustable height for adjusting the orientation of the housing with respect to the resting surface.

In accordance with a preferred embodiment of the disclosure, the multifunction laser leveling tool comprises a leveling operation mode in which the pendulum is released by the locking means, and the first laser plane emitted by the first laser beam emitter is projected onto an objective surface and forms a horizontal laser line thereon.

In accordance with a preferred embodiment of the disclosure, the multifunction laser leveling tool further comprises an oblique line generating operation mode in which an oblique laser line can be formed on an objective surface by the steps of:

1) setting the multifunction laser leveling tool onto a resting surface, with the pendulum being released by the locking means;
2) then locking the pendulum by the locking means; and
3) then tilting the multifunction laser leveling tool so that the first laser plane is projected onto the objective surface and forming an oblique laser line thereon.

In accordance with a preferred embodiment of the disclosure, the multifunction laser leveling tool further comprises a first oblique angle measuring operation mode in which the oblique angle of a line to be measured can be obtained by the steps of:
1) setting the multifunction laser leveling tool onto a resting surface, with the pendulum being released by the locking means;
2) then locking the pendulum by the locking means;
3) then tilting the multifunction laser leveling tool until the line to be measured lies in the first laser plane; and
4) then obtaining the oblique angle of the line to be measured from the measured orientation of the pendulum.

In accordance with a preferred embodiment of the disclosure, the multifunction laser leveling tool further comprises a second oblique angle measuring operation mode in which the oblique angle of a surface to be measured can be obtained by the steps of:
1) setting the multifunction laser leveling tool onto a horizontal resting surface, with the pendulum being released by the locking means;
2) then locking the pendulum by the locking means;
3) then setting the multifunction laser leveling tool onto the surface to be measured; and
4) then obtaining the oblique angle of the surface to be measured from the measured orientation of the pendulum.

In accordance with a preferred embodiment of the disclosure, the multifunction laser leveling tool further comprises calculating means for calculating the real oblique angle from the measured orientation of the pendulum.

It can be seen that the multifunction laser leveling tool of according to the disclosure has multiple functions: generating a horizontal laser line onto an objective surface; generating an oblique laser line onto an objective surface; measuring and displaying the angle of an oblique line; and measuring and displaying the angle of an oblique surface. In this way, the multifunction laser leveling tool of the disclosure significantly facilitates the leveling and measuring operations.

BRIEF DESCRIPTION OF THE DRAWINGS

The disclosure will be further understood by reading the following detailed description with reference to the drawings in which.

DETAILED DESCRIPTION

Now a multifunction laser leveling tool according to preferred embodiments of the disclosure will be described with reference to the drawings.

Figure 1:
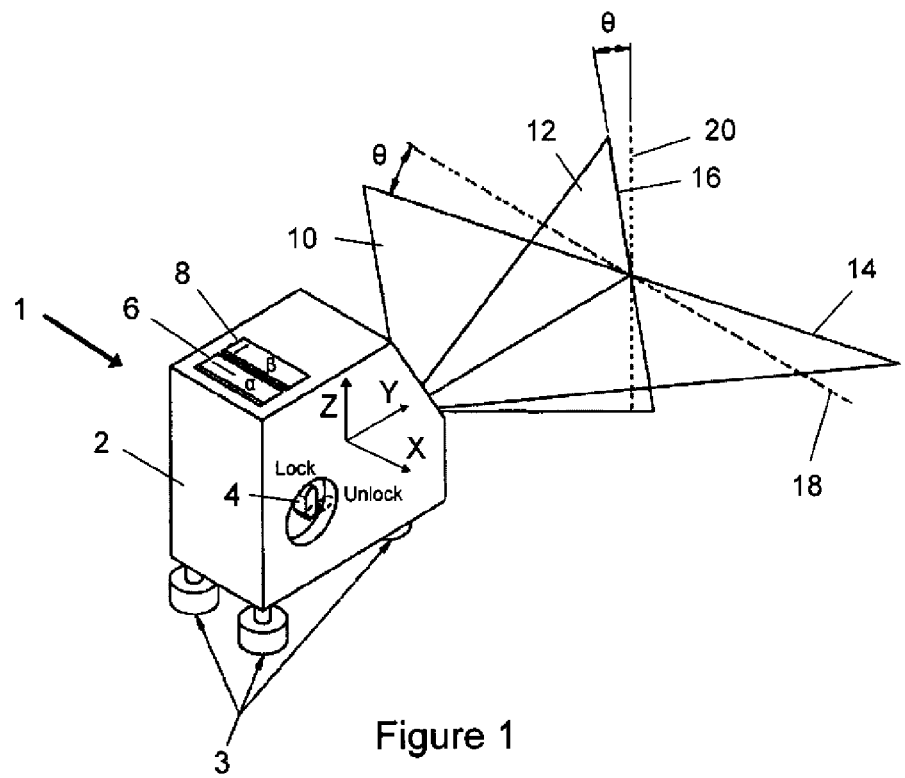
FIG. 1 is a schematic isometric view of a multifunction laser leveling tool according to a preferred embodiment of the disclosure.

As shown in FIG. 1, a multifunction laser leveling tool 1 comprises a housing 2 for accommodating functional components of the tool.

Three feet 3 are attached to the bottom of the housing 2 for supporting the housing 2 on a resting surface (not shown). The feet may each have a fixed height. However, in a preferred embodiment, at least one of the feet 3 has an adjustable height, so that the orientation of the housing with respect to the resting surface can be changed by adjusting the height of the at least one of the feet. Preferably, each of the feet 3 has an adjustable height. The height of an adjustable foot can be adjusted manually or by means of electrical driving means.

It can be understood that the shape and the number of the feet are not limited to those illustrated in FIG. 1, and a skilled in the art can design the feet with any suitable shape and number only if they can support the housing on a resting surface in an adjustable and stable manner.

FIG. 1 also shows a locking lever 4 which is accessible from outside. The locking lever 4 is operated between a locking position as shown by solid lines in FIG. 1 and indicated by "Lock" and an unlocking or releasing position as shown by dashed lines in FIG. 1 and indicated by "Unlock". The locking lever 4 may be provided on any location which is easy accessible by a user, for example, on a side wall or back wall of the housing 2. The function of the locking lever 4 will be described.

FIG. 1 also shows a screen of a display module. The screen comprises two sections 6 and 8 as will be described. The screen is arranged in a location which is easy to be seen, for example, on a top wall of the housing 2. It can be understood that the screen may alternatively comprise other number of section(s).

The orientation or angle information can be displayed by the screen using any one of the following technologies: LCD, LED, TFT, CSTN, or OLED display panel.

The multifunction laser leveling tool 1 is able to emit out at least one laser plane. In the embodiment shown in FIG. 1, the multifunction laser leveling tool 1 can emit out a first laser plane 10 and a second laser plane 12. The second laser plane 12 forms an angle with (for example, perpendicular to, as illustrated) the first laser plane 10.

The multifunction laser leveling tool 1 may be designed to be able to emit three laser planes, i.e., a third additional laser plane will be further emitted. The third laser plane may form an angle with (for example, perpendicular to) each of the first and second laser planes.

In a preferred embodiment, at least one of the angles formed between each pair of the first to third laser planes is adjustable.

Each laser plane may be emitted within a fan angle. However, at least one of the laser planes may have a 360-degree full plane coverage when necessary.

In FIG. 1, a coordinate comprising orthogonal axes X, Y and Z is shown, where in X axis represents a lateral (right-left) direction, Y axis represents a longitudinal (front-back) direction, and Z axis represents a vertical direction.

In the embodiment shown in FIG. 1, the locking lever 4 is in the locking position, and the multifunction laser leveling tool 1 directly faces towards an objective wall (not shown). The multifunction laser leveling tool 1 is in an orientation tilted around X axis by an angle β and tilted around Y axis by an angle α, by adjusting at least one of the feet 3. In this state, the multifunction laser leveling tool 1 emits the first and second laser planes 10 and 12 forwards, which are projected on to objective wall obliquely to form oblique laser lines 14 and 16 respectively thereon. The laser lines 14 and 16 are displaced from imaginary horizontal and vertical lines 18 and 20 by a common oblique angle θ.

The tilting angles α and β are sensed as will be described and are displayed on the sections 6 and 8 of the screen respectively.

It can be understood that the oblique angle θ of the laser lines is a function of the tilting angles α and β. When the Y axis is substantially perpendicular to the objective wall, the oblique angle θ can be determined as being substantially equal to the tilting angle α. However, when the tilting angle β is large enough, the effect of the tilting angle β to the determination of the oblique angle θ should be considered. For this end, the multifunction laser leveling tool 1 may comprise calculating means for calculating the oblique angle θ based on the tilting angles α and β.

Figure 2:
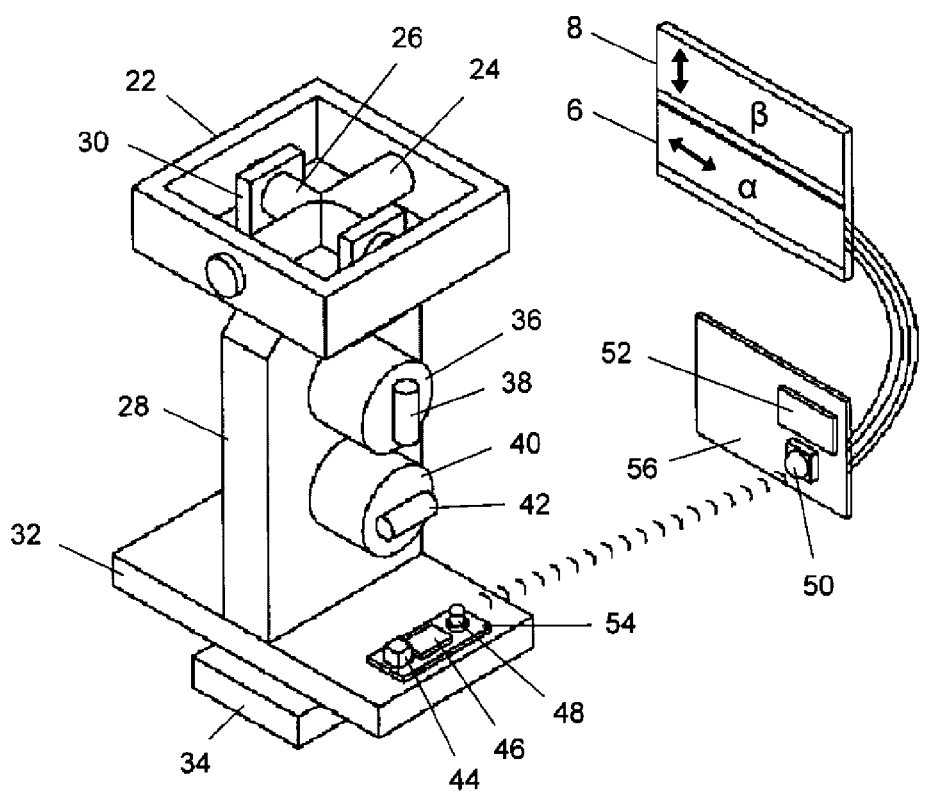
FIG. 2 is a schematic isometric view of major functional components, according to a preferred embodiment of the disclosure, of the laser leveling tool shown in FIG. 1.

FIG. 2 shows major functional components, according to a preferred embodiment of the disclosure, of the multifunction laser leveling tool 1. A frame 22 is fixedly mounted to the housing 2 and carries a pendulum via a universal joint. The universal joint comprises a pair of orthogonal shafts 24 and 26. The shaft 24 extends substantially in the X direction and is rotatably carried at its opposite ends by the frame 22. The shaft 26 is fixed to the shaft 24 and extends substantially in the Y direction.

The pendulum comprises a vertical pendulum body 28, a pair of supporting parts 30 extended upwardly from a top end of the pendulum body 28 and rotatably suspended on opposite ends of the shaft 26, a horizontal platform 32 attached to a bottom end of the pendulum body 28, and a damping block 34 attached to the bottom of the platform 32.

By means of the universal joint, the pendulum is able to pivot around shafts 24 and 26 with respect to the frame 22 (also the housing 2).

The multifunction laser leveling tool 1 comprises locking means for fixedly locking the pendulum to the housing 2. The locking means comprises the above described locking lever 4 and a locking mechanism (not shown) provided in the housing 2. The locking mechanism is actuated by means of the locking lever 4 and in turn acts on the pendulum. When the locking lever 4 is manipulated to move into its locking position, the locking mechanism is driven into a locking state to lock the pendulum fixedly with respect to the housing. When the locking lever 4 is manipulated to move into its unlocking or releasing position, the locking mechanism is driven into an unlocking or releasing state to unlock or release the pendulum so that the pendulum is free to pivot in two directions with respect to the housing.

When the pendulum is released by the locking means, the pendulum comes to a plumb orientation by its weight. The damping block 34 helps the pendulum to reach and keeps its plumb orientation by magnetic interaction with a magnet (not shown) disposed in housing 2, as well known in the art.

A pair of laser beam emitting assemblies 36 and 40 are attached to the pendulum. The laser beam emitting assembly 36 comprises a cylindrical lens 38 for emitting the first laser plane 10, and the laser beam emitting assembly 40 comprises a cylindrical lens 42 for emitting the second laser plane 12. When the pendulum is in its unlocked or released state, the first laser plane 10 is horizontal and the second laser plane 12 is vertical.

An angle sensing means in the form of an angle sensor 44 is attached to the platform 32 of the pendulum, for sensing the tilt angles or orientation of the pendulum. The angle sensor 44 may comprise two single axis accelerometers, a two axis or three axis accelerometer, a capacitive angle sensor, or any other suitable type of angle sensors.

A microcontroller unit (MCU) 46 is also attached to the platform 32 for conditioning, processing and/or digitizing signals from the angle sensor to generate digitized orientation data.

The display module comprises the screen having sections 6 and 8 as described above and a display module driver 52 connected with the screen via wires and drives the screen to operate.

The microcontroller unit 46 is communicated with the display module driver 52 using wireless transmission, for example, via a signal transmitter 48 and a corresponding signal receiver 50, to transfer signals representing the tilt angles of the pendulum determined by the angle sensor 44 to the signal receiver 50. The signal transmitter 48 is attached to the pendulum, and the signal receiver 50 is arranged near the display module driver 52. The signals transmitted by the signal transmitter and receiver can be in infrared (IR) or radio frequency (RF) with any transmission frequency from a few MHz to a few GHz and the transmission technology can be analog or digital nature.

The signal transmitter 48 sends the digitized orientation data from the microcontroller unit 46 to the signal receiver 50, and the display module driver 52 receives the digitized orientation data from the signal receiver 50 and controls the screen to display the digitized orientation data.

The angle sensor 44, the microcontroller unit 46 and the signal transmitter 48 are assembled to a printed circuit broad 54 to form a PCB assembly. The PCB assembly is attached to the pendulum, for example, attached to the platform 32 as illustrated, or attached to any other suitable locations of the pendulum.

Power is fed to the PCB assembly via thin wires. The torque exerted by the wires must be small enough to preserve the accuracy and sensitivity of the pendulum. The signal from the angle sensor can be raw signal such as voltage or current. Some accelerometer has a built-in signal conditioning circuit to convert the raw signal to digital signal.

The signal receiver 50 and the display module driver 52 are assembled to a printed circuit broad 56 which can be mounted within the housing 2, preferably, near the screen.

Figure 3:
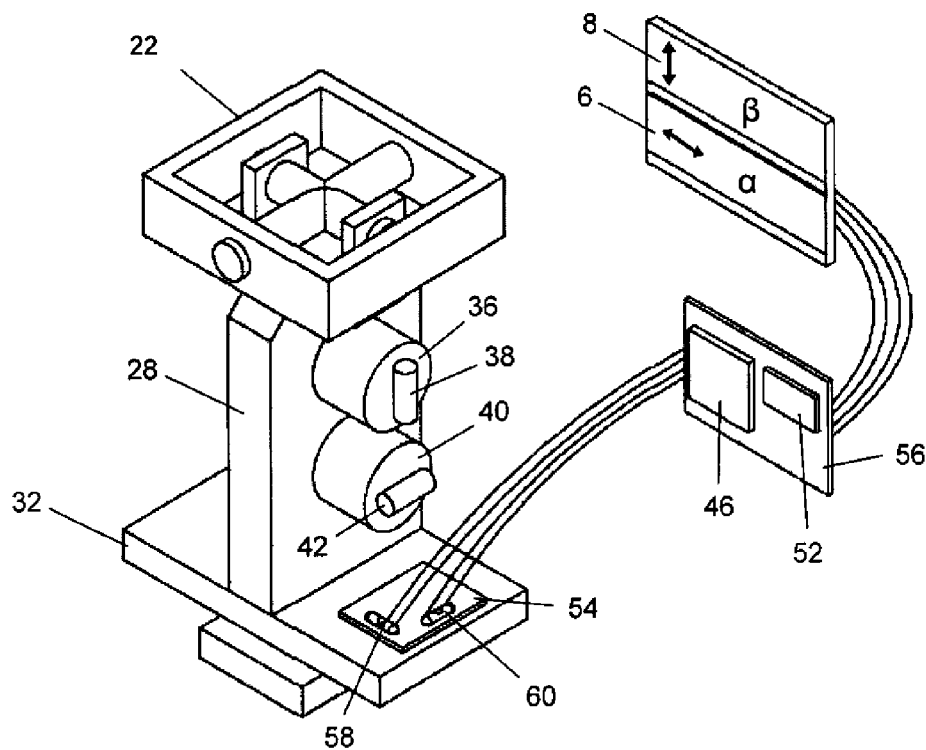
FIG. 3 is a schematic isometric view of major functional components, according to another preferred embodiment of the disclosure, of the laser leveling tool shown in FIG. 1.

FIG. 3 shows major functional components, according to another preferred embodiment of the invention, of the multifunction laser leveling tool 1.

The embodiment shown in FIG. 3 is different with that shown in FIG. 2 mainly in that the angle sensing means for sensing the orientation of the pendulum comprises two single axis bubble vials 58 and 60. The principle axes of the two bubble vials can be orthogonal to each other or they can be at any angle. In the embodiment shown in FIG. 3, the principle axis of the bubble vial 58 is in the Y direction, and the principle axis of the bubble vial 60 is in the X direction. The bubble vials 58 and 60 are assembled to the printed circuit broad 54, and the microcontroller unit 46 and the display module driver 52 are assembled to the printed circuit broad 56. The printed circuit broad 54 is provided with suitable sensors (not shown) for sensing the position of the bubble in each bubble vial according to the tilt angles of the pendulum and thus determining the later. The microcontroller unit 46 is communicated with the sensors for the bubble vials 58 and 60 by wires for receiving signals representing the tilt angles of the pendulum determined by the sensors.

Other aspects of the embodiment shown in FIG. 3 are similar to that shown in FIG. 2 and will not be described here.

Figure 4:
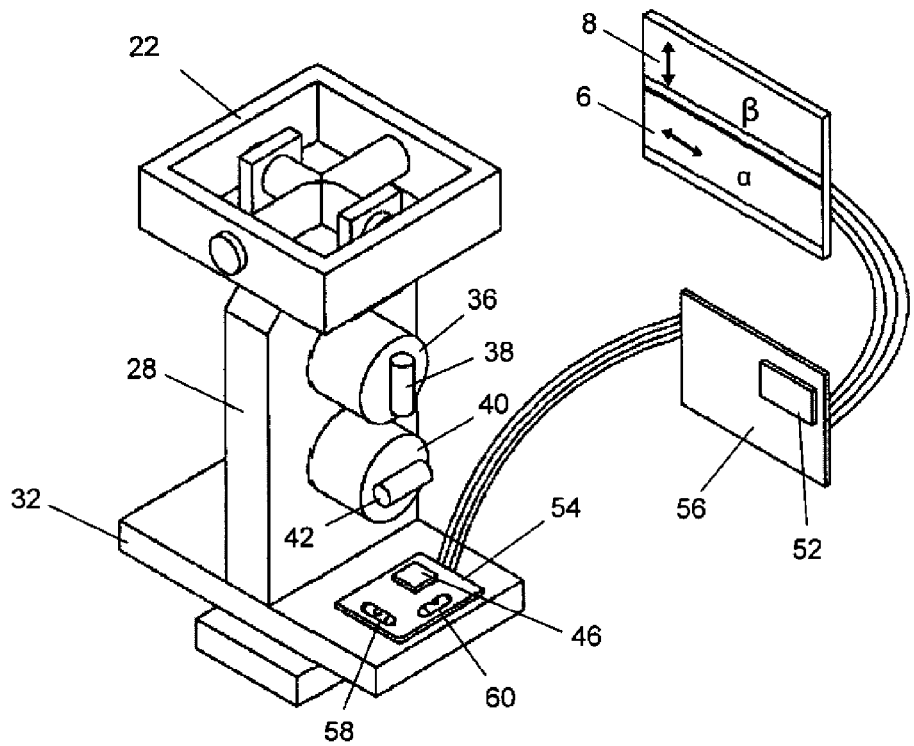
FIG. 4 is a schematic isometric view of major functional components, according to yet another preferred embodiment of the disclosure, of the laser leveling tool shown in FIG. 1.

FIG. 4 shows major functional components, according to yet another preferred embodiment of the disclosure, of the multifunction laser leveling tool 1.

The embodiment shown in FIG. 4 is different with that shown in FIG. 3 mainly in that the microcontroller unit 46 is assembled to the printed circuit broad 54 together with the bubble vials 58 and 60 and corresponding sensors (not shown) for them, and is communicated with the display module driver 52, which is assembled to the printed circuit broad 56, by wires to transfer signals representing the tilt angles of the pendulum determined by the sensors to the printed circuit broad 56.

Other aspects of the embodiment shown in FIG. 4 are similar to that shown in FIG. 3 and will not be described here.

A skilled in the art can design different structures and configurations for the functional components of the multifunction laser leveling tool 1 based on the principle of the disclosure as disclosed here.

In general, the first and second laser planes 10 and 12 have a fixed relationship with the orientation of the pendulum. Therefore, the measured orientation information (or angles) of the pendulum displayed by the display module is direct indication on the laser line angles.

Figure 5:
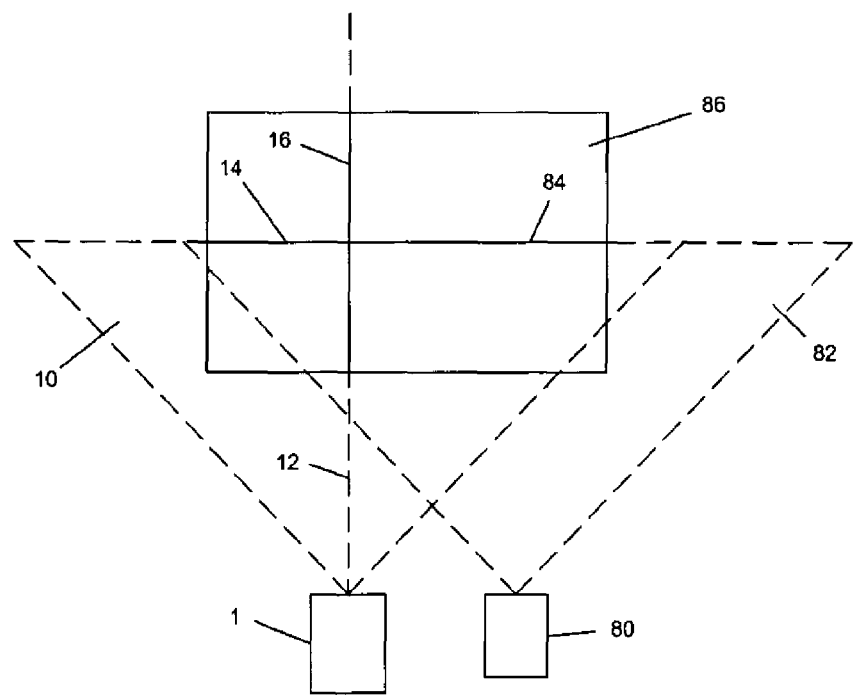
FIG. 5 is a schematic view showing an operation mode of the laser leveling tool of the disclosure.

The multifunction laser leveling tool 1 of the disclosure has a leveling operation mode as schematically shown in FIG. 5. For testing the operation and function of the multifunction laser leveling tool 1, a traditional laser leveling tool 80 is also arranged as a reference. The reference laser leveling tool 80 emits out a horizontal laser plane 82. The horizontal laser plane 82 is projected onto an objective wall 86, which is in front of reference laser leveling tool 80, and forms a horizontal laser line 84 thereon.

The multifunction laser leveling tool 1 of the disclosure is oriented to be facing towards the objective wall 86. The multifunction laser leveling tool 1 is in the leveling operation mode in which the pendulum is released from the locking means, and is thus free to rotate with respect to the housing and will always be rested at the equilibrium plumb position. At this position, the output of the angle sensing means should read zero degree if the pendulum and the sensor are calibrated correctly. Meanwhile, multifunction laser leveling tool 1 emits out horizontal and vertical laser planes 10 and 12 which are projected onto the objective wall 86 and forms a horizontal laser line 14 and a vertical laser line 16 thereon respectively.

Figure 6:
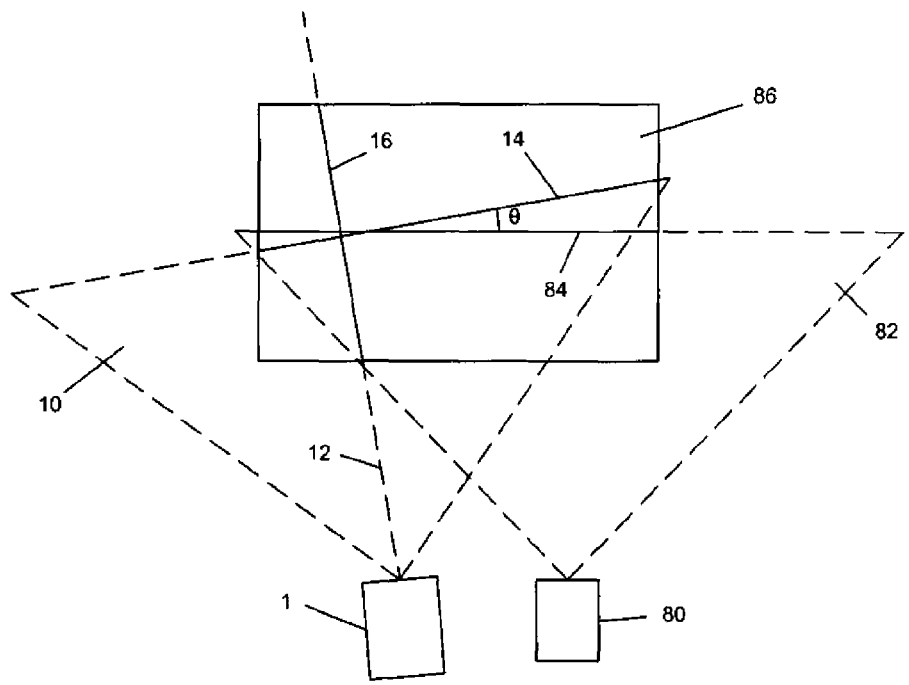
FIG. 6 is a schematic view showing another operation mode of the laser leveling tool of the disclosure.

Further, the multifunction laser leveling tool 1 of the disclosure has an oblique line generating operation mode as schematically shown in FIG. 6.

In this operation mode, when the pendulum is locked fixedly in position by the locking means, i.e., in locked mode, the pendulum is no longer free to rotate due to gravity. The first and second laser lines 14 and 16 formed on the objective wall 86 can be adjusted to any orientation by adjusting the adjustable feet 3 or the resting surface of the multifunction laser leveling tool. FIG. 6 shows that the first laser line 14 forms an angle $\theta$ with the horizontal laser line 84 formed on the objective wall 86 by the reference laser leveling tool 80. The slopes or oblique angles of the laser lines relative to the true vertical and horizontal are indicated by the display module. To obtain the most accurate reading, the multifunction laser leveling tool 1 should face the objective surface directly, at 90 degree angle of incident. Otherwise, the calculating means described above is required for calculating the true oblique angles.

The multifunction laser leveling tool 1 of the disclosure further has an oblique angle measuring operation mode in which the oblique angle of a line to be measured can be obtained. This oblique angle measuring operation mode can be understood from FIG. 6. Specifically, when there is an oblique line on the objective wall, by adjusting the multifunction laser leveling tool 1 in a way similar to those described above with reference to FIG. 6 so that the first laser line 14 or the second laser line 16 formed on the objective wall coincides with the oblique line, the oblique angle of the oblique line can be derived, either directly or after calculating by the calculating means, from the measured orientation of the pendulum.

The multifunction laser leveling tool 1 of the disclosure further has another oblique angle measuring operation mode in which the oblique angle of a surface to be measured can be obtained. In this operation mode, the multifunction laser leveling tool 1 is set onto a horizontal resting surface, with the pendulum being released by the locking means. Then, the pendulum is locked by the locking means. After that, the multifunction laser leveling tool 1 is set onto the surface to be measured. Then, the oblique angle of the surface to be measured can be derived, either directly or after calculating by the calculating means, from the measured orientation of the pendulum.

It can be seen that the multifunction laser leveling tool of according to the disclosure has integrated several functions in the same tool. These functions comprise at least: generating at least a horizontal laser line onto an objective surface; generating at least one oblique laser line onto an objective surface; measuring and displaying the angle of an oblique line; and measuring and displaying the angle of an oblique surface. Thus, the multifunction laser leveling tool of the disclosure significantly facilitates the leveling and measuring operations in various industries, especially in construction industry.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

The invention claimed is:

1. A multifunction laser leveling tool comprising:
   a housing;
   a pendulum supported by the housing via a universal joint so that the pendulum is pivotable with respect to the housing around a first axis and a second axis perpendicular to the first axis;
   a locking mechanism which is configured to fixedly lock the pendulum to the housing and to release the pendulum therefrom, wherein when the pendulum is released, the pendulum is in a plumb orientation and the first and second axes lie in a horizontal plane;
   at least one adjusting device attached to the housing and configured to adjust an orientation of the housing with respect to a surface that the housing rests upon;
   a first laser beam emitter attached to the pendulum and configured to emit a first laser plane which is parallel to the horizontal plane in which the first and second axes lie;

an angle sensing mechanism attached to the pendulum configured to measure an orientation of the pendulum; and a display module attached to the housing configured to display the measured orientation of the pendulum.

2. The multifunction laser leveling tool of claim 1, further comprising:
a second laser beam emitter configured to emit a second laser plane which forms an angle with the first laser plane and to which the first axis is parallel.

3. The multifunction laser leveling tool of claim 1, wherein the angle sensing mechanism comprises at least one of:
(i) at least one of two single axis accelerometers, a two axis accelerometer, and a three axis accelerometer;
(ii) at least one of two single axis bubble vials and a single circular bubble vial; and
(iii) a capacitive angle sensor.

4. The multifunction laser leveling tool of claim 1, wherein the display module comprises a screen on which the measured orientation of the pendulum is displayed and a display module driver which drives the screen.

5. The multifunction laser leveling tool of claim 4, further comprising a microcontroller unit configured to at least one of process and digitalize signals from the angle sensing mechanism and output digitized data to the display module driver.

6. The multifunction laser leveling tool of claim 5, wherein:
the microcontroller unit is attached to the pendulum; and
the microcontroller unit is in communication with the display module driver via at least one of:
(i) a signal transmitter attached to the pendulum and a signal receiver attached to the housing; and
(ii) at least one of a connection wire and a connection cable.

7. The multifunction laser leveling tool of claim 6, wherein a signal transmitted from the signal transmitter to the signal receiver is at least one of an infrared signal and a radio frequency signal.

8. The multifunction laser leveling tool of claim 5, wherein:
the microcontroller unit is attached to the housing; and
the angle sensing mechanism is in communication with the microcontroller unit via:
(i) a signal transmitter attached to the pendulum and a signal receiver attached to the housing; and
(ii) a at least one of a connection wire and a connection cable.

9. The multifunction laser leveling tool of claim 8, wherein a signal transmitted from the signal transmitter to the signal receiver is at least one of an infrared signal and a radio frequency signal.

10. The multifunction laser leveling tool of claim 1, wherein the housing comprises feet configured to support the multifunction laser leveling tool on a resting surface, at least one of the feet having an adjustable height operable to adjust the orientation of the housing with respect to the resting surface.

11. The multifunction laser leveling tool of claim 1, further comprising a calculating mechanism configured to calculating an oblique angle from a measured orientation of the pendulum.

12. A method of using a multifunction laser leveling tool having (i) a housing, (ii) a pendulum supported by the housing via a universal joint so that the pendulum is pivotable with respect to the housing around a first axis and a second axis perpendicular to the first axis, (iii) a locking mechanism which is configured to fixedly lock the pendulum to the housing and to release the pendulum therefrom, wherein when the pendulum is released, the pendulum is in a plumb orientation and the first and second axes lie in a horizontal plane, (iv) at least one adjusting device attached to the housing and configured to adjust an orientation of the housing with respect to a surface that the housing rests upon; (v) a first laser beam emitter attached to the pendulum and configured to emit a first laser plane which is parallel to the horizontal plane in which the first and second axes lie, (vi) an angle sensing mechanism attached to the pendulum configured to measure an orientation of the pendulum, and (vii) a display module attached to the housing configured to display the measured orientation of the pendulum, the method comprising:
performing a leveling operation which includes:
releasing the pendulum from the locking mechanism; and
emitting the first laser plane with the first laser beam emitter such that the first laser plane is projected onto an objective surface and forms a horizontal laser line thereon.

13. The method of claim 12, further comprising performing an oblique line generating operation that includes:
setting the multifunction laser leveling tool onto a resting surface, with the pendulum released from the locking mechanism;
then locking the pendulum with the locking mechanism; and
then tilting the multifunction laser leveling tool so that the first laser plane is projected onto the objective surface and forms an oblique laser line thereon.

14. The multifunction laser leveling tool of claim 12, further comprising performing an oblique angle measuring operation for measuring an oblique angle of a line, the oblique angle measuring operation including:
setting the multifunction laser leveling tool onto a resting surface, with the pendulum released from the locking mechanism;
then locking the pendulum with the locking mechanism;
then tilting the multifunction laser leveling tool until the line to be measured lies in the first laser plane; and
then obtaining the oblique angle of the line from a measured orientation of the pendulum.

15. The method of claim 14, wherein obtaining the oblique angle of the line includes calculating the oblique angle from the measured orientation of the pendulum using a calculating mechanism.

16. The method of claim 12, further comprising performing an oblique angle measuring operation for measuring an oblique angle of a surface, the oblique angle measuring operation including:
setting the multifunction laser leveling tool onto a horizontal resting surface, with the pendulum released from the locking mechanism;
then locking the pendulum with the locking mechanism;
then setting the multifunction laser leveling tool onto the surface to be measured; and
then obtaining the oblique angle of the surface to be measured from a measured orientation of the pendulum.

17. The method of claim 16, wherein obtaining the oblique angle of the surface includes calculating the oblique angle from the measured orientation of the pendulum using a calculating mechanism.

* * * * *

UNITED STATES PATENT AND TRADEMARK OFFICE
CERTIFICATE OF CORRECTION

PATENT NO. : 9,441,963 B2  
APPLICATION NO. : 14/378180  
DATED : September 13, 2016  
INVENTOR(S) : Eric Hung-Ying Yuen et al.

Page 1 of 1

It is certified that error appears in the above-identified patent and that said Letters Patent is hereby corrected as shown below:

In the claims

In column 9, lines 48-49, claim 8 should read:

(ii) at least one of a connection wire and a connection cable.

Signed and Sealed this
Twentieth Day of December, 2016

Michelle K. Lee
*Director of the United States Patent and Trademark Office*